United States Patent
Chiang

(10) Patent No.: US 10,051,017 B2
(45) Date of Patent: Aug. 14, 2018

(54) ERROR HANDLING DURING IMS REGISTRATION

(71) Applicant: T-Mobile USA, Inc., Bellevue, WA (US)

(72) Inventor: Hsin-Fu Henry Chiang, Bellevue, WA (US)

(73) Assignee: T-Mobile USA, Inc., Bellevue, WA (US)

(*) Notice: Subject to any disclaimer, the term of this patent is extended or adjusted under 35 U.S.C. 154(b) by 98 days.

(21) Appl. No.: 15/392,978

(22) Filed: Dec. 28, 2016

(65) Prior Publication Data

US 2018/0183839 A1 Jun. 28, 2018

(51) Int. Cl.
| | |
|---|---|
| *H04L 29/06* | (2006.01) |
| *H04W 88/02* | (2009.01) |
| *H04W 80/10* | (2009.01) |
| *H04W 84/12* | (2009.01) |

(52) U.S. Cl.
CPC ...... *H04L 65/1069* (2013.01); *H04L 65/1016* (2013.01); *H04W 80/10* (2013.01); *H04W 84/12* (2013.01); *H04W 88/02* (2013.01)

(58) Field of Classification Search
CPC ........... H04L 65/1016; H04L 65/1069; H04W 80/10; H04W 84/12; H04W 88/02
See application file for complete search history.

(56) References Cited

U.S. PATENT DOCUMENTS

| | | | |
|---|---|---|---|
| 2008/0089290 A1 | 4/2008 | Coulas et al. | |
| 2008/0160996 A1* | 7/2008 | Li | H04L 41/12 455/433 |
| 2008/0182575 A1* | 7/2008 | Torres | H04W 24/04 455/435.1 |
| 2011/0142015 A1 | 6/2011 | Shaikh et al. | |
| 2012/0180119 A1 | 7/2012 | Bessis et al. | |

FOREIGN PATENT DOCUMENTS

| | | |
|---|---|---|
| EP | 2448212 | 5/2012 |
| WO | WO2010120432 | 10/2010 |

OTHER PUBLICATIONS

PCT Search Report and Written Opinion dated Apr. 19, 2018 for PCT Application No. PCT/US17/64524, 11 pages.

* cited by examiner

*Primary Examiner* — Benjamin H Elliott, IV
(74) *Attorney, Agent, or Firm* — Lee & Hayes, PLLC

(57) ABSTRACT

In instances where a user equipment (UE) encounters an issue during an attempt to register for Internet Protocol Multimedia Subsystem (IMS) service, the UE is configured with improved logic for handling the encountered issue. For instance, the UE may transmit a multiple unprotected registration requests to multiple different IMS nodes, and may receive multiple registration responses from the multiple different IMS nodes that each specify a type of error in a particular error category, all the while evaluating whether a criterion is met. Upon the criterion being met, the UE can refrain from transmitting any additional unprotected registration requests, thereby alleviating network bandwidth consumption, yet giving the UE a fair chance to successfully register for IMS service.

20 Claims, 4 Drawing Sheets

ERROR HANDLING DURING IMS REGISTRATION

BACKGROUND

Internet Protocol Multimedia Subsystem (IMS) is an architectural framework defined by the $3^{rd}$ Generation Partnership Project (3GPP) for delivering Internet Protocol (IP) multimedia to user equipment (UE) of the IMS network. An IMS core network (sometimes referred to as the "IMS core", the "Core Network (CN)," or the "IM CN Subsystem") permits wireless and wireline devices to access IP multimedia, messaging, and voice applications and services. IMS allows for peer-to-peer communications, as well as client-to-server communications over an IP-based network.

Before a UE can utilize IMS-based services, the UE performs a registration procedure, which involves transmitting registration requests to, and receiving registration responses from, the IMS core. During this registration procedure, if there is an issue with registering the UE for service, the IMS core may send the UE a registration response that specifies an error, such as a 403 Forbidden error. Pursuant to 3GPP standards, if the UE receives a 403 Forbidden response to a registration request, the UE is to re-attempt registration. However, this is a suboptimal approach to handling a 403 Forbidden registration response because it may be the case that the issue causing the registration failure will never be resolved, and the UE will never be registered for service, regardless of how many times the UE reattempts registration. Repeated attempts at registration place an undue burden on network resources, especially when many UE's are engaged in the same type of repeated registration reattempts.

Another approach to handling a 403 Forbidden response to a registration request is to refrain from re-attempting registration altogether if the UE receives such an error in a registration response. This is also suboptimal because it may prevent UEs from reattempting registration when these UEs would otherwise successfully register if registration was reattempted. Accordingly, at least some UEs will unduly go without service using this approach. The difficulty in devising a suitable approach to handling a 403 Forbidden response to a registration request lies in the inability of the UE and the IMS core to discern the exact issue that is causing the registration failure, as there may be many possible issues causing a 403 Forbidden registration response.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
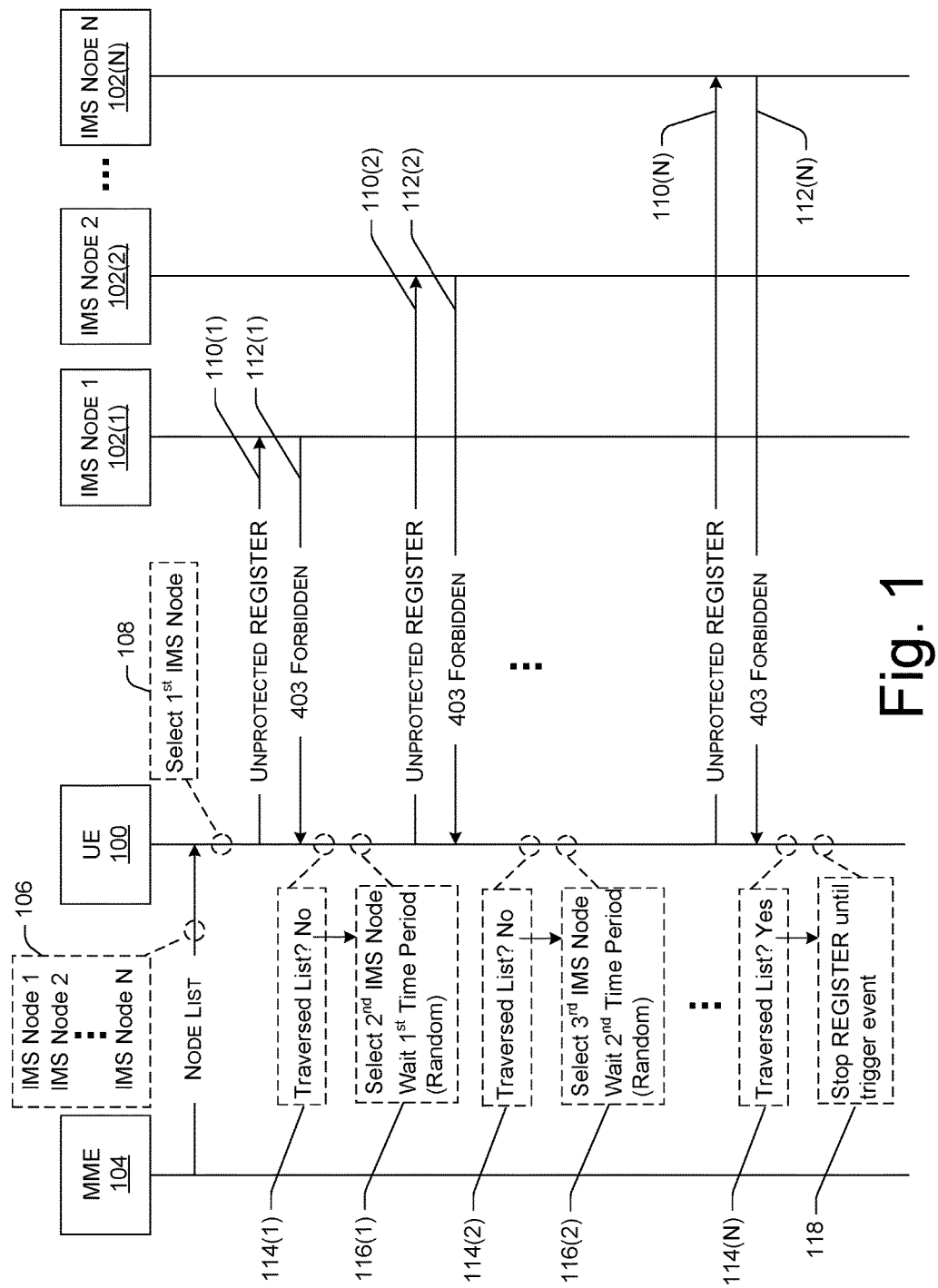
FIG. 1 is a diagram illustrating example signaling between a UE and various network nodes when the UE encounters an example issue during a registration procedure, FIG. 1 illustrating improved UE logic for responding to the issue.

Described herein are techniques and systems for improved handling, by a UE, of issues encountered during registration for IMS-based service. Before establishing a communication session (e.g., a voice call), a UE is configured to carry out a registration procedure by transmitting a registration request(s) to the IMS core. This registration procedure involves the UE initially obtaining a list of IMS nodes (e.g., a list of proxy call session control function (P-CSCF) nodes) that are available to the UE. Such a list of available IMS nodes may be provided by a mobility management entity (MME) as part of a node discovery procedure. The UE can then select a first IMS node in the list of available IMS nodes, and transmit an initial unprotected registration request, such as a SIP request using the REGISTER method.

In response to the unprotected registration request, the UE can receive various types of registration responses from the IMS node. If a requirement exists to send information "integrity protected," and barring any other issues that cause registration failure, the UE typically receives a 401 Unauthorized challenge (or sometimes a 407 Proxy Authentication Required challenge) in a registration response to the initial unprotected registration request. Upon being challenged, the UE can send an integrity protected registration request with information responding to the challenge. If the information transmitted by the UE in the integrity protected registration is determined by a node in the IMS core to be compliant with existing procedures, the UE may receive a 200 OK registration response from the IMS node and proceed to establish a communication session over the IMS core.

However, in some instances, the UE receives a registration response to the initial unprotected registration request that specifies a particular type of error, such as a 403 Forbidden error, or any similar type of error that can be included in a particular error category. Disclosed herein are techniques and systems for improved handling of such errors in a registration response to an unprotected registration request. In general, the UE, in response to a registration response specifying a type of error in a particular error category, is configured to retry registration for a limited duration such that, upon a criterion being met, the UE refrains from transmitting any additional unprotected registration requests until the occurrence of a trigger event. In other words, if the UE receives a first registration response from a first IMS node that specifies a type of error in a particular error category, such as a 403 Forbidden error, the UE is configured to respond by selecting a second IMS node among the IMS nodes available to the UE, and transmitting a second unprotected registration request to the second IMS node in an attempt to re-register for service. The UE is configured to re-attempt registration in this manner for the additional IMS nodes in the list of IMS nodes available to the UE until a criterion is met. If, during these multiple re-attempts at registration, the UE receives a 401 Unauthorized challenge (or a 407 Proxy Authentication Required challenge) from one of the IMS nodes, the UE can respond to the challenge, and if the correct information is provided, the UE will ultimately receive a 200 OK response to proceed with a desired IMS-based service. However, if, after re-attempting registration multiple times, a criterion is met, the UE ceases any future reattempts at registration until the occurrence of a trigger event, thereby reducing network bandwidth consumption.

In some embodiments, the criterion evaluated for ceasing future registration attempts can comprise determining whether there is an IMS node in the list of available IMS nodes that the UE has not already sent an unprotected registration request to. In this embodiment, if the UE has already sent unprotected registration requests to all of the IMS nodes available to the UE, the UE determines that the criterion is met, and thereafter, the UE ceases transmitting any future registration requests until the occurrence of a trigger event.

In another embodiment, the criterion evaluated for ceasing future registration attempts can comprise determining whether a predetermined period of time has lapsed since initiating the registration procedure. In this embodiment, when the time period has lapsed, the UE determines that the criterion is met, and thereafter, the UE ceases making any future registration requests until the occurrence of a trigger event. In some embodiments, multiple criteria can be evaluated, such as the criteria discussed above, and upon determining that any one criterion of the evaluated criteria is met, the UE can cease making any future registration requests until the occurrence of a trigger event.

By configuring the UE to re-attempting registration for a limited duration with respect to different IMS nodes available to the UE, the UE is given a fair chance to successfully register for service if the UE should be able to register for service. If the UE is unsuccessful after reattempting registration for the limited duration, however, transmission of any additional registration requests may be halted, which reduces network bandwidth consumption in the carrier network. In other words, if the UE were configured to reattempt registration indefinitely without stopping, network bandwidth would be needlessly consumed by the UE. By contrast, the techniques and systems described herein pertain to a UE that is configured to refrain from transmitting any additional registration requests after the UE has re-attempted registration for the limited duration, which reduces network bandwidth consumption and increases network bandwidth that can be made available for other processes and applications.

In general, processes are disclosed herein for implementation on a UE with improved handling of issues encountered during IMS registration. Also disclosed herein are systems and devices comprising one or more processors and one or more memories, as well as non-transitory computer-readable media storing computer-executable instructions that, when executed, by one or more processors perform various acts and/or processes disclosed herein.

FIG. 1 is a diagram illustrating example signaling between a UE 100 and various network nodes. FIG. 1 illustrates a scenario where the UE 100 encounters an example issue(s) during the UE's 100 attempt at registering for service with an IMS core, as well as the UE's 100 implementation of improved logic for responding to the issue(s).

In accordance with various embodiments described herein, the terms "user equipment (UE)," "wireless communication device," "wireless device," "communication device," "mobile device," and "client device," may be used interchangeably herein describe any UE (e.g., the UE 100) that is capable of transmitting/receiving data wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), VoLTE, Institute of Electrical and Electronics Engineers' (IEEE) 802.1x protocols, WiMAX, Wi-Fi, Data Over Cable Service Interface Specification (DOCSIS), digital subscriber line (DSL), and/or any future IP-based network technology or evolution of an existing IP-based network technology. The UE 100 may be implemented as any suitable type of computing device configured to communicate over a wireless network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), an in-vehicle (e.g., in-car) computer, and/or any similar mobile device, as well as situated computing devices including, without limitation, a television (smart television), set-top-box (STB), desktop computer, and the like.

In general, a user can utilize the UE 100 to communicate with other users and associated UEs via an IMS core (sometimes referred to as the "IMS core network," the "IMS network," the "Core Network (CN)," or the "IM CN Subsystem"). IMS is an architectural framework defined by 3GPP for delivering Internet Protocol (IP) multimedia to a UE, such as the UE 100. The IMS core can be maintained and/or operated by one or more service providers, such as one or more wireless carriers ("carriers"), that provide IMS-based services to users (sometimes called "subscribers") who are associated with UEs, such as the UE 100. For example, a service provider may offer multimedia telephony services that allow a subscribed user to call or message other users via the IMS core using his/her UE. A subscriber can also utilize an associated UE to receive, provide, or otherwise interact with various different IMS-based services by accessing the IMS core. FIG. 1 illustrates multiple example IMS nodes 102(1), 102(2), . . . , 102(N) (collectively 102) that the UE 100 can communicate with for these purposes. In some embodiments, the IMS nodes 102 represent multiple different P-CSCF nodes. A P-CSCF node is one of many nodes of the IMS core, and is merely an example of an IMS node 102. The P-CSCF node is typically the first point of contact for the UE 100, and as such, the P-CSCF node is utilized predominantly for providing a user-to-network interface. It is to be appreciated that the IMS nodes 102 of FIG. 1 can represent any other suitable type of IMS node other than a P-CSCF node.

Accordingly, an operator of the IMS core may offer any type of IMS-based service, such as, telephony services, emergency services (e.g., E911), gaming services, instant messaging services, presence services, video conferencing services, social networking and sharing services, location-based services, push-to-talk services, and so on. In order to access these services (e.g., telephony services), a UE is configured to request establishment of a communication session. In the case of telephony services, the communication session can comprise a call (i.e., a voice-based communication session, such as a VoLTE call, or a Wi-Fi call).

The UE 100 is also configured to utilize various radio access networks (RANs) in order to access the IMS core, such as via one or more of the IMS nodes 102. In general, the IMS core is agnostic to the access technology that is used to connect a UE to the IMS core. In this manner, the UE 100 can connect to the IMS core via a 3GPP RAN, such a GSM/EDGE RAN (GERAN), a Universal Terrestrial RAN (UTRAN), or an evolved UTRAN (E-UTRAN), or alternatively, via a "non-3GPP" RAN, such as a Wi-Fi RAN, or another type of wireless local area network (WLAN) that is based on the IEEE 802.11 standards. Accessing the IMS core through a Wi-Fi access network typically involves the UE 100 communicating with the IMS core through a Wi-Fi access point (AP). Providing access to the IMS core through non-3GPP RANs has opened the door to recent advancements in IMS-based services, such as the introduction of Wi-Fi calling, which allows users to initiate and receive calls over an available Wi-Fi AP.

When the subscriber of a carrier's service powers on the UE 100, the UE 100 is configured to execute boot code and perform various initialization procedures. Eventually, the UE 100 will try to "attach" to the carrier's network in order to transmit data to, and receive data from, the IMS core. To do this, the UE 100 can initiate an IP connectivity access network (IP-CAN) session by sending a Create Packet Data Protocol (PDP) Context Request or a Create Bearer Request message to a Mobility Management Entity (MME) 104, or a component or subsystem of the MME 104. In general, the MME 104 may be configured to assist with attachment and activation procedures, as well as perform idle mode UE tracking, paging procedures, and so on. In response to the communication from the UE 100, the MME 104 can provide a list 106 of IMS nodes (e.g., a list of P-CSCF addresses) available to the UE 100 as shown in FIG. 1. The example list 106 shown in FIG. 1 includes the IMS nodes 102(1)-102(N), which may represent any number of IMS nodes 102. For example, the list 106 can include a single IMS node 102, or any number of multiple IMS nodes 102. Often, the UE 100 obtains a list of about two or three IMS nodes 102, such as two or three P-CSCF nodes. Obtaining the list 106 of available IMS nodes 102 by the UE 100 is sometimes referred to herein as a "node discovery procedure." When the IMS nodes 102 represent P-CSCF nodes, this is referred to as a "P-CSCF discovery procedure."

At 108, after the UE 100 receives the list 106 of available IMS nodes 102, the UE 100 can select a first IMS node 102(1) among the available IMS nodes 102 in the list 106 to attempt registration through the selected IMS node 102(1). The UE 100 can implement any suitable node selection approach, such as a top-down approach by selecting the first IMS node 102(1) in the list 106. However, node selection at 108 is not limited to using a top-down approach. Alternative node selection approaches may comprise random selection of an IMS node 102 from the list 106, a bottom-up approach that selects the last IMS node 102(N) in the list 106, where after the UE 100 traverses the list 106 from the bottom up, or any other suitable approach for selecting one IMS node 102 from multiple available IMS nodes 102. Furthermore, the available IMS nodes 102 do not have to be provided in the form of a list 106. In the example of FIG. 1, the first IMS node 102 selected at 108 happens to be the IMS node 102(1), which is the first IMS node 102 in the list 106.

The UE 100 can initiate registration by transmitting a first unprotected registration request 110(1) to the selected, first IMS node 102(1), which, as noted above, may represent a first P-CSCF node. An "unprotected" registration request, as used herein, means "integrity unprotected" in terms of the unprotected registration request not including "integrity protected" information pursuant to the 3GPP standards (See 3GPP Technical Specification (TS) 33.203). An "unprotected" registration request may also be defined as a registration request that does not prompt a 401 (or 407) challenge response from the IMS core (See 3GPP TS 24.229).

Session Initiation Protocol (SIP) may be used for transmitting messages, such as registration messages (e.g., registration requests), subscription messages, communication session messages, and the like, to the IMS core (e.g., to the IMS nodes 102), and for receiving messages (e.g., registration responses) therefrom. SIP is a signaling protocol that can be used to establish, modify, and terminate multimedia sessions (e.g., a multimedia telephony call) over packet networks, and to authenticate access to IMS-based services. As used herein, a "SIP request" is a message that is sent from a UE, such as the UE 100, to the IMS core (e.g., to any of the IMS nodes 102 in FIG. 1) using SIP protocol, and a "SIP response" is a message that is sent from the IMS core (e.g., from any of the IMS nodes 102 in FIG. 1) to a UE, such as the UE 100, using SIP protocol.

Accordingly, the first unprotected registration request 110(1) can comprise a SIP request using the SIP REGISTER method. The first unprotected registration request 110(1) is sometimes referred to as an "INIT REGISTER" request to indicate that the registration status of the UE 100 is initially designated as an initial registration status, prior to its designation as either an active registration status or a terminated registration status. The selected, first IMS node 102(1), upon receipt of the first unprotected registration request 110(1), can send a first registration response 112(1). Depending on the circumstances at the time the first unprotected registration request 110(1) is received by the first IMS node 102(1), the first registration response 112(1) can take various forms. For example, the first registration response 112(1) can specify a 401 Unauthorized challenge, a 407 Proxy Authentication Required challenge, or a particular type of error, such as a 403 Forbidden error. In the example of FIG. 1, the first IMS node 102(1) is shown as sending a first registration response 112(1) that specifies a particular type of error in a particular error category; namely, a 403 Forbidden error. This type of error (perhaps along with other types of errors within the particular error category) may be treated using improved error handling logic at the UE 100, as described herein. That is, the UE 100 may be configured to carry out the example procedures shown the Figures, such as the procedures shown in FIG. 1, in response to receiving a particular type of error (e.g., the 403 Forbidden error) in the first registration response 112(1) from the first IMS node 102(1).

According to FIG. 1, in response to receiving the first registration response 112(1) from the first IMS node 102(1) and determining that the first registration response 112(1) specifies a type of error in a particular error category, the UE 100 can determine whether a criterion is met at 114(1). In the example of FIG. 1, the criterion is met when the UE 100 has traversed the entire list 106 of available IMS nodes 102 by individually transmitting unprotected registration requests to all of the IMS nodes 102 in the list 106. Said another way, the criterion is met (in the example of FIG. 1) when there are no additional (or remaining) IMS nodes 102 among the multiple available IMS nodes 102 in the list 106 to which the UE 100 has not already transmitted an unprotected registration request. Thus, when this criterion is evaluated at 114(1) of FIG. 1, and assuming the list 106 includes at least the IMS nodes 102(1), 102(2), and 102(N), the UE 100 has not yet transmitted unprotected registration requests to the IMS nodes 102(2)-102(N). Accordingly, the UE 100 determines, at 114(1), that the criterion is not met, as indicated by "Traversed List? No" in FIG. 1.

At 116(1), in response to determining, at 114(1), that the criterion is not met, the UE 100 selects a second IMS node 102(2) in the list 106 in order to re-attempt registration with the second IMS node 102(2). Again, any suitable node selection approach (e.g., top-down, bottom-up, random, etc.) can be used to select a different IMS node 102 of the remaining IMS nodes 102 in the list 106 at 116(1).

FIG. 1 also shows, at 116(1), that the UE 100 can wait until a lapse of a first time period before transmitting a subsequent unprotected registration request to the selected, second IMS node 102(2). The first time period that the UE 100 waits at 116(1) can be determined "on the fly" in response to receiving the first registration response 112(1) from the first IMS node 102(1). In some embodiments, the first time period can be determined based at least in part on a number of unprotected registration requests (e.g., the first unprotected registration request 110(1)) that have been transmitted by the UE 100 to an IMS node 102. In the example of FIG. 1, at the time that the UE 100 receives the first registration response 112(1) that specifies the 403 Forbidden error, there has been one unprotected registration request (i.e., the unprotected registration request 110(1)) transmitted by the UE 100. Using this number as "P" in the following Equation (1), the UE 100 can determine the first time period to wait at 116(1) as follows:

$$T_1 = 0.5W \sim W \text{ (Random); where } W = \text{Base Time} \times 2^P \quad (1)$$

Equation (1) indicates that the first time period, $T_1$, can comprise a randomly selected time that falls within a time range of 0.5 W to W, where W is calculated using a Base Time and a number, P, which, as noted above, represents a number of unprotected registration requests that have been transmitted from the UE 100 to an IMS node 102 during the registration procedure. For example, if the Base Time=30 seconds, and the number, P, of previously-transmitted unprotected registration requests is equal to 1, then W=60 seconds, and the first time period, $T_1$, is a randomly selected value within a time range of 30 seconds and 60 seconds, according to Equation (1). Thus, the first time period, $T_1$, is based at least in part on the value of P, which can represent the number of unprotected registration requests that have been transmitted at a time after transmitting the first unprotected registration request 110(1) and before transmitting a subsequent unprotected registration request.

The time period (e.g., the first time period, $T_1$) calculated pursuant to Equation (1) can be superseded, in some instances, by a wait time value that is indicated in a header field (e.g., a Retry-After header field) of the first registration response 112(1). Instances where the header field value in a registration response 112 may supersede the time period calculated with Equation (1) is when the wait time value specified in the header field of a registration response 112 is greater than the time period calculated pursuant to Equation (1). For example, if the first time period, $T_1$, is a randomly selected value within a time range of 30 seconds and 60 seconds, according to Equation (1), and the UE 100 receives a registration response (e.g., the first registration response 112(1)) with a Retry-After header field value of 300 seconds, then the UE 100 can wait until a lapse of the wait time value of 300 seconds specified in the Retry-After header field due to 300 seconds being greater than a value within the range of 30 seconds and 60 seconds. However, in instances where the time period calculated with Equation (1) is greater than or equal to the wait time value specified in a Retry-After header field of the registration response 112, the UE 100 may be configured to wait until lapse of the time period calculated with Equation (1) instead of the wait time value specified in the Retry-After header field of the registration response 112.

Continuing with the example of FIG. 1, the UE 100 is configured to wait until the first time period has lapsed before transmitting a second unprotected registration request 110(2) to the selected, second IMS node 102(2). This technique of waiting for a lapse of the first time period, as opposed to immediate transmission of the second unprotected registration request 110(2), gives components of the carrier network time to recover from an issue that may be resolved with time, such as high network congestion.

In response to the second unprotected registration request 110(2), the UE 100 may receive a second registration response 112(2) from the second IMS node 102(2). The second registration response 112(2) can specify the same type of error (e.g., a 403 Forbidden error) as the error that was specified in the first registration response 112(1), or a different type of error in the same error category as the type of error specified in the first registration response 112(1). FIG. 1 shows an example where the type of error is the same in both the first and second registration responses 112(1) and 112(2).

In response to receiving the second registration response 112(2) from the second IMS node 102(2) and determining that the second registration response 112(2) specifies the type of error in the particular error category (here, the 403 Forbidden error), the UE 100 can determine whether the criterion is met at 114(2). For example, the UE 100 can determine, at 114(2) whether the entire list 106 of available IMS nodes 102 has been traversed by individually transmitting unprotected registration requests to all of the IMS nodes 102 in the list 106. According to the example of FIG. 1, the UE 100 determines, at 114(2), that the criterion is not met, as indicated by "Traversed List? No" in FIG. 1 (i.e., the UE 100 has not yet sent an unprotected registration request to the IMS node 102(N) in the list 106, and therefore, the criterion is not met at 114(2).

At 116(2), in response to determining, at 114(2), that the criterion is not met, the UE 100 selects a third IMS node 102 (e.g., an IMS node 102(3)) in the list 106 in order to re-attempt registration with the third IMS node 102(3). Again, any suitable node selection approach (e.g., top-down, bottom-up, random, etc.) can be used to select a different IMS node 102 of the remaining IMS nodes 102 in the list 106 at 116(2).

FIG. 1 also shows, at 116(2), that the UE 100 can wait until a lapse of a second time period before transmitting a subsequent unprotected registration request to the selected, third IMS node 102(3). The second time period can be determined on-the-fly at 116(2), and can be different than the first time period determined at 116(1) in that the second time period can be greater (or longer) than the first time period. For example, utilizing Equation (1), above, and noting that P=2 at the time of receiving the second registration response 112(2)—because there have been two unprotected registration requests (110(1) and 110(2)) transmitted by the UE 100—the second time period, $T_2$, can be calculated as $T_2 = 0.5 \sim W$ (Random); where $W = \text{Base Time} \times 2^2$. For a Base Time=30 seconds, the second time period, $T_2$, is a randomly selected value between 60 seconds and 120 seconds. Thus, in the above example, the first time period determined at 116(1), $T_1$, is selected as a time period between 30 seconds and 60 seconds, while the second time period determined at 116(2), $T_2$, is selected as a time period between 60 seconds and 120 seconds.

FIG. 1 illustrates that this technique of waiting a longer and longer period of time before transmitting a subsequent unprotected registration request 110 can be performed for any suitable number of iterations to an $N^{th}$ attempt at registering for service through a $N^{th}$ IMS node 102(N) where the criterion is determined to be met at 114(N), as shown by "Traversed List? Yes" in FIG. 1. In response to determining that the criterion is met at 114(N)—e.g., in response to determining, at 114(N), that there are no additional IMS nodes 102 among the multiple available IMS nodes 102 in the list 106 to which the UE 100 has not already sent an unprotected registration request 110—the UE 100 is configured to stop (or refrain from) transmitting any additional unprotected registration requests at 118 until an occurrence of a trigger event. Example trigger events will be described in more detail below. Refraining from transmitting any additional unprotected registration requests to the IMS core at 118 avoids needlessly consuming network bandwidth in the face of an issue that is unlikely to resolve itself with more time.

In some embodiments, in addition to ceasing any future transmissions of unprotected registration requests, at 118, the UE 100 may also disconnect from an IMS access point name (APN), pursuant to the 3GPP packet data network (PDN) disconnection mechanism. In some embodiments, the UE 100 can maintain a circuit switched (CS) domain registration throughout the signaling shown in FIG. 1, such as maintaining a CS domain registration between transmission of the successive unprotected registration requests 110. This may be useful for enabling CS fallback procedures, or otherwise providing service to the UE 100 on a CS network where the UE 100 is experiencing registration failure on a packet switched network.

Of course, the technique of refraining from transmitting any additional registration requests at 118 upon determining that the criterion is met at 114(N) can be implemented without also implementing the wait times at 116. That is, the UE 100 may transmit subsequent unprotected registration requests 110 without waiting for any time period, but still evaluating the criterion at 114 along the way.

Figure 2:
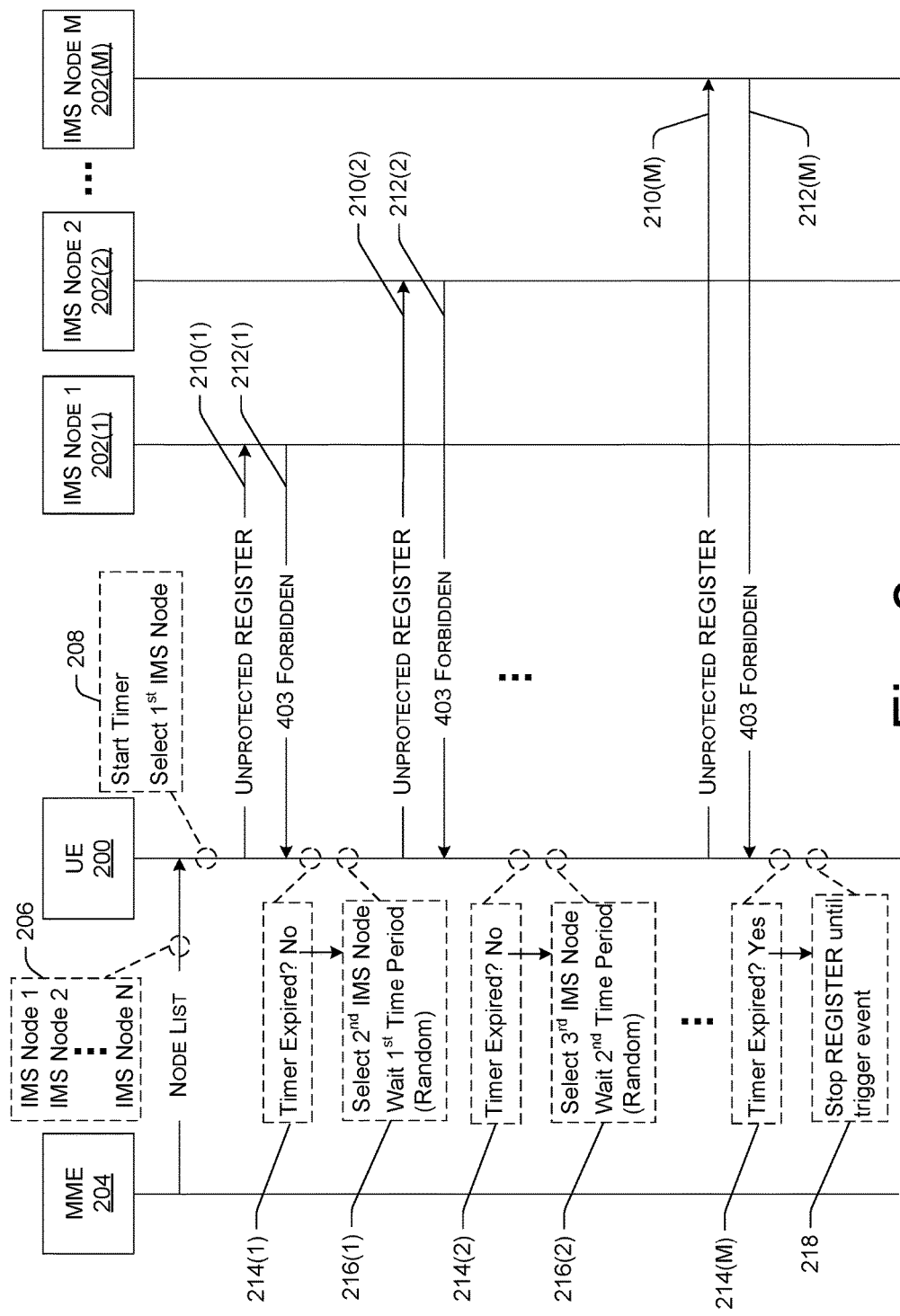
FIG. 2 is a diagram illustrating example signaling between a UE and various network nodes when the UE encounters an example issue during a registration procedure, FIG. 2 illustrating improved UE logic for responding to the issue according to another embodiment.

FIG. 2 is a diagram illustrating example signaling between a UE 200 and various network nodes 202 when the UE 200 encounters an example issue(s) during a registration procedure in a similar fashion to the issue(s) encountered in the example of FIG. 1. FIG. 2, however, illustrates another embodiment of implementing improved UE logic for responding to the issue(s). Specifically, a different criterion is evaluated in the example of FIG. 2; namely a lapse of a predetermined period of time.

In FIG. 2, the UE 200 obtains a list 206 of available IMS nodes 202 from an MME 204, and initiates a registration procedure by starting a timer at 208, and by selecting a first IMS node 202(1) among the available IMS nodes 202 in the list 206. The timer started at 208 may be set to run for a predetermined period of time that is continually evaluated throughout the signaling shown in FIG. 2 to determine when to stop transmitting additional unprotected registration requests 210 at 218. The predetermined period of time may be any suitable period measured in any suitable units of time, such as a period of 5 minutes. It is to be appreciated that the operations and signaling shown in FIG. 2 may be implemented in a similar manner to that described with reference to FIG. 1, such as by using any suitable node selection approach at 208 to select the first IMS node 202(1).

Furthermore, the entities shown in FIG. 2 may represent entities similar to those described above with respect to FIG. 1, such as the IMS nodes 202 representing P-CSCF nodes of the IMS core.

After selecting the first IMS node 202(1), the UE 100 transmits a first unprotected registration request 210(1) to the selected, first IMS node 202(1). The first IMS node 202(1), upon receipt of the first unprotected registration request 210(1), can send a first registration response 212(1) that specifies a type of error in a particular error category; in this example, a 403 Forbidden error. This indicates that there is an issue(s) preventing successful registration of the UE 200, but it is unknown as to the exact issue causing the registration failure. Thus, the techniques shown in FIG. 2 can be carried out to give the UE 200 a fair chance at registering for IMS-based services, but limiting the re-attempts at registration to the period of time since the timer was started at 208.

Accordingly, in response to receiving the first registration response 212(1) from the first IMS node 202(1) and determining that the first registration response 212(1) specifies a type of error in a particular error category (e.g., the 403 Forbidden error), the UE 200 can determine whether a criterion is met at 214(1). In the example of FIG. 2, the criterion is met when the UE 100 determines that the predetermined period of time has lapsed (or expired) since the timer was started at 208. Accordingly, the UE 200 determines, at 214(1), that the criterion is not met, as indicated by "Timer Expired? No" in FIG. 2.

At 216(1), in response to determining, at 214(1), that the criterion is not met, the UE 200 selects a second IMS node 202(2) in the list 206 in order to re-attempt registration with the second IMS node 202(2). FIG. 2 also shows, at 216(1), that the UE 200 is configured to wait until a lapse of a first time period at 216(1) before transmitting a subsequent unprotected registration request 210(2) to a second IMS node 202(2), similar to the technique described with reference to FIG. 1. Thus, the UE 200, after waiting for the first period of time to lapse, transmits a second unprotected registration request 210(2) to a selected, second IMS node 202(2) among the remaining IMS nodes 202 in the list 206 to which the UE 200 has not already transmitted an unprotected registration request 210. In response to the second unprotected registration request 210(2), the UE 200 may receive a second registration response 212(2) from the second IMS node 202(2). The second registration response 212(2) can also specify the type of error in the particular error category (e.g., the 403 Forbidden error) if the issue causing registration failure is unresolved.

In response to receipt of the second registration response 212(2) where the UE 200 encounters the 403 Forbidden error, the UE 200 can evaluate the criterion at 214(2) to determine whether the predetermined period of time has lapsed since starting the timer at 208. The example of FIG. 2 shows that the predetermined period of time has not yet lapsed at 214(2), so the UE 200, in response, selects a third IMS node 202 (e.g., a third IMS node 202(3)), and waits until a lapse of a second time period before transmitting a subsequent unprotected registration request to the third IMS node 202(3).

FIG. 2 shows that this technique of re-attempting registration can iterate any number of "M" times until the criterion is determined to be met at 214(M) in response to receipt of an $M^{th}$ registration response 212(M) that specifies the type of error in the particular error category (e.g., the 403 Forbidden error). In the example of FIG. 2, the criterion is met at 214(M) when the predetermined period of time has lapsed since starting the timer at 208, as shown by "Timer Expired? Yes" in FIG. 2. Upon determining that the criterion is met at 214(M), the UE 200 is configured to stop (or refrain from) transmitting any additional unprotected registration requests at 218 until an occurrence of a trigger event. Example trigger events will be described in more detail below.

It is to be appreciated that, depending on the number of IMS nodes 202 in the list 206, evaluating a lapse of a predetermined period of time as the criterion may mean that the UE 200 does not traverse the entire list 206 (i.e., does not send unprotected registration requests 210 to one or more IMS nodes 202 in the list 206), or that the UE 200 sends multiple unprotected registration requests 210 to a single IMS node 202 in the list 206 before ceasing transmission of future unprotected registration requests 210 at 218. That is, for a short list 206, the UE 200 may traverse the list 206 multiple times before the predetermined period of time expires at 214(M), and for long lists 206, the UE 200 may only get through some of the IMS nodes 202 in the list 206 before the predetermined period of time expires at 214(M).

Other criteria can be evaluated in addition to, or as an alternative to, the example criteria described with reference to FIGS. 1 and 2. For example, instead of evaluating whether the UE 100 has traversed the list 106 (as in FIG. 1), or whether predetermined time period has lapsed (as in FIG. 2), the UE 100/200 can monitor the number, P, of unprotected registration requests 110/210 transmitted from the UE 100/200 to an IMS node 102/202, and the criterion is met when the number, P, of unprotected registration requests 110/210 meets or exceeds a threshold (e.g., maximum) number of unprotected registration requests. Thus, the limited duration of re-attempts at registration may be implemented by ceasing future transmissions of unprotected registration requests 110/210 when the UE 100/200 has reached a threshold number of registration attempts.

In addition, a combinatorial criteria approach can be utilized where multiple criteria are evaluated while the UE 100/200 attempts and re-attempts registration in the face of a registration failure. In this combinatorial criteria approach, determining whether the criterion is met may comprise determining whichever criterion of multiple criteria is met first. For example, the predetermined period of time described with reference to FIG. 2 can be monitored along with the criterion of whether the UE 100/200 has traversed the entire list 106/206, and/or along with the criterion of whether the UE 100/200 has met or exceeded a threshold number of registration attempts, and whichever criterion occurs first causes the UE 100/200 to cease transmitting any future unprotected registration requests 110/210.

It is also to be appreciated that the particular error category that triggers the UE's 100/200 responsive logic, as described herein, can include any suitable error type(s). This is due to possible differences in network configuration from one provider to another and the different uses for different error types. For example, a first carrier may be interested in monitoring 403 Forbidden errors to implement the techniques described herein, while a second carrier may be interested in monitoring another 4xx type of error.

The processes described in this disclosure may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other architectures as well.

Figure 3:
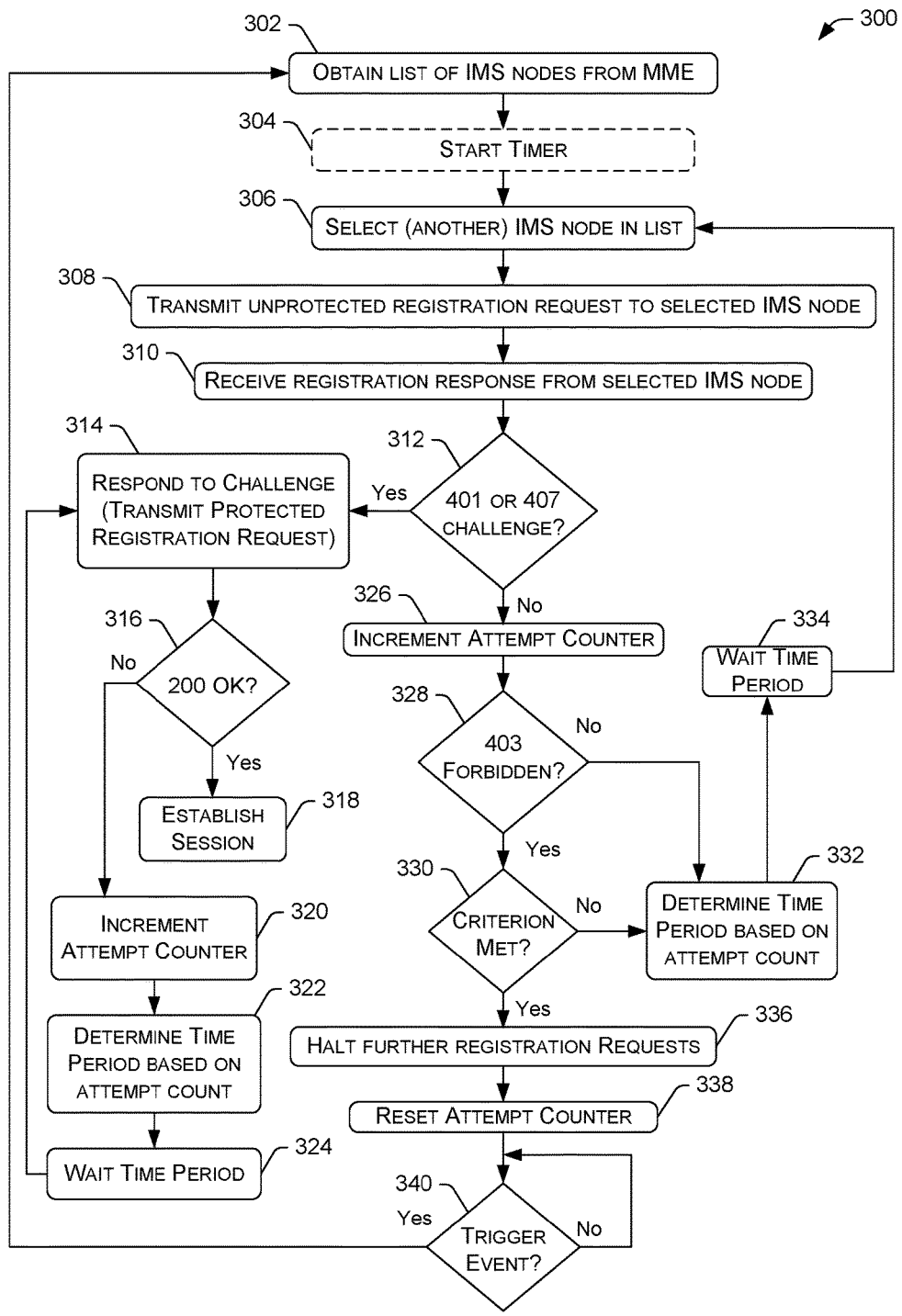
FIG. 3 illustrates a flowchart of an example process for responding to issues encountered during registration for IMS-based service.

FIG. 3 illustrates a flowchart of an example process 300 for responding to issues encountered during registration for IMS-based service. For purposes of discussion, the process 300 is described with reference to the UEs 100/200 of FIGS. 1-2.

At 302, the UE 100/200 may obtain a list 106/206 of IMS nodes 102/202 that are available to the UE 100/200. The IMS nodes 102/202 in the list 106/206 may represent P-CSCF nodes of the IMS core. The list 106/206 may be obtained at 302 from a MME 104/204 as part of a node discovery procedure.

At 304, a timer can be started for evaluating a lapse of a period of time as a criterion for ceasing transmission of registration requests. It is noted that starting the timer at 304 is optional where such a predetermined period of time is not evaluated in lieu of a different criterion that is evaluated. The timer can be a local timer started by the UE 100/200, or a remote timer that is remotely located from the UE 100/200 and triggered to start in response to a signal from the UE 100/200.

At 306, the UE 100/200 can select a first IMS node 102(1)/202(1) in the list 106/206 of available IMS nodes 102/202. The block 306 in FIG. 3 indicates "selecting (another) IMS node in the list," with "another" in parentheses because the first iteration of the process 300 will select a first IMS node 102/202 at 306, and subsequent iterations of block 306 will select "another" different IMS node 102/202 in the list 106/206.

At 308, the UE 100/200 can transmit an initial unprotected registration request 110/210, such as a SIP request using the REGISTER method, to the selected IMS node 102(1)/202(1). A first instance of operation 308 can transmit a first unprotected registration request 110(1)/210(1), as shown in FIGS. 1 and 2.

At 310, the UE 100/200 can receive a registration response 112/212 from the selected IMS node 102(1)/202(1).

At 312, the UE 100/200 can determine, based on the registration response 112/212 received at 310, whether the registration response 112/212 specifies a 401 Unauthorized challenge or a 407 Proxy Authentication Required challenge. If, at 312, it is determined that the registration response 112/212 received at 310 specifies the 401 or 407 challenge, the process 300 follows the "yes" route from 312 to 314, where the UE 100/200 can respond to the 401 or 407 challenge. For example, the UE 100/200 may transmit information "integrity protected" in a protected registration request at 314. A "protected" registration request may be defined as a registration request that is transmitted in response to a 401 challenge or a 407 challenge. The information may be calculated, or otherwise derived, by the UE 100/200 to send a secret key only derivable by the UE 100/200 and a node of the IMS core.

The UE 100/200 receives a response to the protected registration request, and at 316, the UE 100/200 can determine whether the response to the protected registration request comprises a 200 OK response. For example, if the UE 100/200 derived and transmitted the correct information at 314 that matches information independently obtained or derived by the IMS core, the UE 100/200 will receive a 200 OK response. Following a 200 OK response, the UE 100/200 can proceed to establish a communication session at block 318. The establishment of a communication session at 318 can comprise the UE 100/200 transmitting a SIP request using the SIP INVITE method to establish a communication session (e.g., a voice call), or any similar type of session using any suitable IMS-based service. In other words, if the process 300 performs blocks 302-318 in sequence the first time the process 300 is performed, then the UE 100/200 does not encounter an issue during registration, and the remaining blocks shown in FIG. 3 need not be performed.

If, at 316, the response to the protected registration request sent at 314 does not comprise a 200 OK response (e.g., the response to the protected registration request specifies a 403 Forbidden error), the process 300 follows the "no" route from 316 to 320 where an attempt counter is incremented. At block 320, an attempt (or registration attempt) may correspond to the transmission of the protected registration request at 314. Thus, the first protected registration request transmitted at block 314 causes the attempt counter to increment to 1 attempt at block 320.

At 322, the UE 100/200 can determine a time period based at least in part on the number of previous protected registration requests transmitted from the UE 100/200 to an IMS node 102/202 at block 314, which is tracked by the attempt counter incrementing at block 320. For example, the period of time can be determined at 322 according to Equation (1), above, where the period of time is a randomly selected value within a time range, the time range being calculated using a Base Time value and the number, P, of previous protected registration requests transmitted from the UE 100/200 to an IMS node 102/202. For example, with one previously transmitted protected registration request (i.e., P=1), and a Base Time=30 seconds, the time period determined at 322 can comprise a randomly selected time period between a range of 30 seconds and 60 seconds.

At 324, the UE 100/200 can wait until a lapse of the time period determined at block 322 before proceeding back to block 314. Once the time period has lapsed, the process 300 iterates by returning to block 314 and sending another protected registration request to a different IMS node 102/202 in the list 106/206. This loop from blocks 314-324 may iterate indefinitely. In some embodiments, the process 300 can proceed from decision block 316 directly to block 314 without performing blocks 320-324 (i.e., without waiting between sequential protected registration requests).

Returning to decision block 312, if it is determined that the registration response 112/212 to the unprotected registration request 110/210 received at block 310 does not specify a 401 or 407 challenge, the process 300 follows the "no" route from 312 to 326 where an attempt counter is incremented. The attempt counter at block 326 can represent a count of a number of previous unprotected registration requests 110/210 transmitted from the UE 100/200 to an IMS node 102/202 at the time the process 300 reaches block 326. In the first iteration of the process 300 that proceeds from 312 to 326, the attempt counter is incremented from P=0 to P=1 at block 326 because one unprotected registration request 110/210 has been transmitted at 308.

At 328, the UE 100/200 determines whether the registration response 112/212 received at block 310 specifies a type of error in a particular error category, such as a 403 Forbidden error. If such an error is specified in the registration response 112/212 received at block 310, the process 300 proceeds along the "yes" route from decision block 328 to decision block 330 where a criterion (or multiple criteria) is evaluated to determine whether the criterion is met. For example, the criterion may be met at 330 if the UE 100/200 determines that there are no additional IMS nodes 102/202 among the multiple available IMS nodes 102/202 in the list 106/206 to which the UE 100/200 has not already sent an unprotected registration request 110/210. As another example, the criterion may be met at 330 if the UE 100/200 determines that the predetermined period of time has lapsed since the starting of the timer at block 304. As yet another example, the criterion may be met at 330 if the UE 100/200 determines that a number, P, of unprotected registration requests 110/210 transmitted from the UE 100/200 to the IMS nodes 102/202 is equal to a threshold number (e.g., a maximum number) of unprotected registration requests. The number, P, of unprotected registration requests 110/210 evaluated at block 330 can correspond to the value of the attempt counter after block 326. In some embodiments, multiple of these criteria are evaluated at decision block 330, and the UE 100/200 may determine whether any single criterion (or a predetermined number of multiple criteria) among the multiple criteria is met.

In a first iteration of the process 300, assume that the criterion is not met at 330. In this case, the process 300 follows the "no" route from decision block 330 to block 332 where the UE 100/200 determines a time period based at least in part on the number, P, of previous unprotected registration requests 110/210 transmitted from the UE 100/200 to the IMS nodes 102/202 in the list 106/206. For example, the period of time can be determined at block 332 according to Equation (1), above, where the period of time is a randomly selected value within a time range, the time range being calculated using a Base Time value and the number, P, of previous unprotected registration requests 110/210 transmitted from the UE 100/200 to the IMS nodes 102/202 in the list 106/206.

At 334, the UE 100/200 can wait until a lapse of the time period determined at 332 before proceeding back to block 306, where another IMS node 102/202 in the list 106/206 is selected, and blocks 306-312 iterate. How the process 300 proceeds from decision block 312 depends on the registration response 112/212 received at 310 to a subsequent unprotected registration request 110/210, such as a second unprotected registration request 110(2)/210(2) for a second iteration of block 308. Alternatively, the process 300 can proceed from decision block 330 directly to block 306 without performing blocks 332 and 334 (i.e., transmitting a subsequent unprotected registration request 110(2)/210(2) without waiting).

The process 300 can iterate by traversing the blocks 306, 308, 310, 312, 326, 328, 330, 332, and 334, and the attempt counter is incremented at 326 on each iteration, causing the UE 100/200 to wait longer and longer periods of time at 334 before transmitting a subsequent unprotected registration request 110/210 at block 308. These iterations occur until the UE 100/200 determines that the criterion is met at 330.

In response to the criterion being met at decision block 330, the process 300 follows the "yes" route from decision block 330 to block 336 where the UE 100/200 refrains from transmitting any additional unprotected registration requests 110/210 to the IMS nodes 102/202 in the list 106/206. This reduces network bandwidth consumption by avoiding the transmission of needless unprotected registration requests that are unlikely to result in successful registration for the UE 100/200.

Once the UE 100/200 determines to stop further transmissions of unprotected registration requests at block 336, the attempt counter that was incremented at block 326 can be reset (e.g., by setting P=0) at block 338, and the UE 100/200 can wait for an occurrence of a trigger event at decision block 340.

In some embodiments, the trigger event evaluated at decision block 340 is whether the UE 100/200 has been powered down and subsequently powered up (e.g., by the user of the UE 100/200 power cycling the UE 100/200). In some embodiments, the trigger event evaluated at decision block 340 is whether a subscriber identification module (SIM) card has been changed (or swapped) for another SIM card in the UE 100/200. In some embodiments, the trigger event evaluated at decision block 340 is whether the UE 100/200 has moved within range of a different RAN, or moved from roaming coverage to non-roaming coverage, or vice versa. For example, the UE 100/200 may initially attach to the carrier network via a 3GPP RAN, and when the process 300 is carried out until decision block 340 is reached, the UE 100/200 may move into range of (or attaches to the carrier network via) a Wi-Fi (non-3GPP) RAN, which is determined as an occurrence of the trigger event at block 340. The trigger event at block 340 may work similarly when the UE 100/200 is determined to have moved between any two different RANs in any direction, such as from a 3GPP RAN to a Wi-Fi (non-3GPP) RAN, or vice versa, from a first 3GPP RAN to a second, different 3GPP RAN, from a first Wi-Fi RAN to a second, different Wi-Fi RAN. Similarly, the trigger event may occur at block 340 when the UE 100/200 (initially attached to a roaming partner's carrier network via a first RAN) attaches to a home carrier's network through a second RAN, or vice versa (i.e., roaming-to-home network, or home-to-roaming network).

Until the trigger event is detected at decision block 340, the process 300 can iterate at 340 by following the "no" route from 340 and continually monitoring for occurrence of the trigger event at 340. However, once a trigger event occurs at 340, the process 300 follows the "yes" route back to block 302 where the UE 100/200 obtains a new list 106/206 of IMS nodes 102/202. In other words, when the UE 100/200 power cycles, swaps SIM cards, or moves between RANs or between roaming and non-roaming networks, it may make sense to attempt registration procedures again, so the process 300 is re-initiated with the attempt counter reset to zero.

Returning to decision block 328, if it is determined that the registration response 112/212 received at block 310 does not specify a type of error in a particular error category (e.g., does not specify the 403 Forbidden error), the process 300 follows the "no" route from decision block 328 to block 332, and proceeds as described above to block 334, and then to block 306. In other words, for other types of errors that are not included in the particular error category of interest, it may make sense for the UE 100/200 to retry registration with the IMS nodes 102/202 in the list 106/206 indefinitely.

Thus, the process 300 illustrates techniques for responding to issues encountered during registration for IMS-based service(s) that are improved over existing UE procedures. For instance, the implementation of re-attempting registration by transmitting multiple unprotected registration requests 110/210 for a limited duration reduces network bandwidth consumption by refraining from transmitting needless unprotected registration requests 110/210 once it is determined that additional attempts are unlikely to resolve a currently encountered issue.

Figure 4:
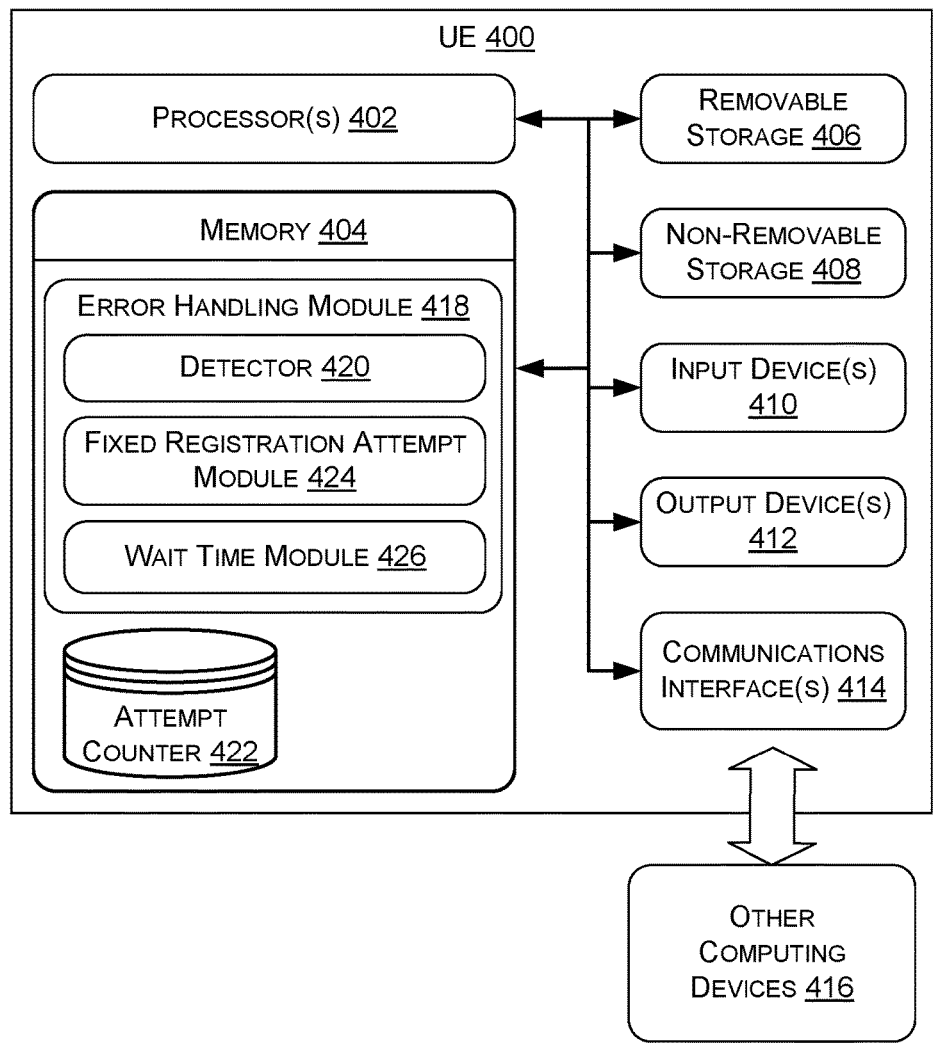
FIG. 4 is a block diagram of an example UE with logic for responding to issues encountered during registration for IMS-based service.

FIG. 4 is a block diagram of an example UE 400 with logic for responding to issues encountered during registration. The UE 400 may be representative of the UE 100 of FIG. 1, or the UE 200 of FIG. 2, and may be configured to implement the signaling shown in FIGS. 1 and/or 2, as well as the process 300 shown in FIG. 3.

As shown, the UE 400 may include one or more processors 402 and one or more forms of computer-readable memory 404. The UE 400 may also include additional storage devices. Such additional storage may include removable storage 406 and/or non-removable storage 408.

The UE 400 may further include input devices 410 and output devices 412 communicatively coupled to the processor(s) 402 and the computer-readable memory 404. The UE 400 may further include communications interface(s) 414 that allow the UE 400 to communicate with other computing devices 416 (e.g., IMS nodes 102/202) such as via a network(s). The communications interface(s) 414 may facilitate transmitting and receiving wired and/or wireless signals over any suitable communications/data technology, standard, or protocol, as described herein. For example, the communications interface(s) 414 can comprise one or more of a cellular radio, a wireless (e.g., IEEE 802.1x-based) interface, a Bluetooth® interface, and so on. In some embodiments, the communications interface(s) 414 may allow for attachment to a carrier network (e.g., an LTE network) via a non-3 GPP RAN (e.g., a Wi-Fi AP and the Internet). The communications interface(s) 414 may further enable the UE 400 to communicate over circuit-switch domains and/or packet-switch domains.

In various embodiments, the computer-readable memory 404 comprises non-transitory computer-readable memory 404 that generally includes both volatile memory and non-volatile memory (e.g., random access memory (RAM), read-only memory (ROM), erasable programmable read-only memory (EEPROM), Flash Memory, miniature hard drive, memory card, optical storage, magnetic cassettes, magnetic tape, magnetic disk storage or other magnetic storage devices, or any other medium). The computer-readable memory 404 may also be described as computer storage media and may include volatile and nonvolatile, removable and non-removable media implemented in any method or technology for storage of information, such as computer readable instructions, data structures, program modules, or other data. Computer-readable memory 404, removable storage 406 and non-removable storage 408 are all examples of non-transitory computer-readable storage media. Computer-readable storage media include, but are not limited to, RAM, ROM, EEPROM, flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the UE 400. Any such computer-readable storage media may be part of the UE 400.

The memory 404 can include error handling module 418 (i.e., computer-executable instructions (or logic) that, when executed, by the processor(s) 402, perform the various acts and/or processes disclosed herein). For example, the error handling module 418 can be configured to determine how best to respond to a registration response received from an IMS node 102/202 that specifies a type of error in a particular error category causing registration failure. For instance, the error handling module 418 can implement a detector 420, which is configured to detect the type of registration error at block 328 of the process 300, and whether it falls into a particular error category. The detector 420 may also be configured to determine when a 401 challenge or a 407 challenge is specified in the registration response at block 312, and/or whether a registration response to a protected registration request comprises a 200 OK response at block 316.

For example, when the detector 420 a registration response that specifies something other than a 401 challenge or a 407 challenge at block 312, error handling module 418 can increment the attempt counter 422 at block 326, and the detector 420 may further determine the type of error in the registration response 112/212 and whether the error falls in a particular error category.

The error handling module 418 may further include a fixed registration attempt module 424 to implement the logic for evaluating the criterion (or multiple criteria) at block 330 and for halting the transmission of any additional unprotected registration request at block 336 until a trigger event occurs at 340. This fixed registration attempt module 424 is particularly useful when the UE 400 encounters an unrecoverable error in response to an unprotected registration request 110/210.

The error handling module 418 may further include a wait time module 426 that is configured to dynamically determine a randomly selected wait time for purposes of staggering sequentially transmitted registration requests (e.g., sequential unprotected registration requests 110/210). The wait time module 426 can utilize Equation (1) to determine a period of time at any given iteration of the process 300 based on the value of the attempt counter 422. For example, as the number of previous unprotected registration requests counted by the attempt counter 422 increases, the time period calculated by the wait time module 426 increases, thereby configuring the UE 400 to wait longer and longer periods of time before transmitting any subsequent registration requests to the IMS nodes 102/202.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

I claim:

1. A device comprising:
   a processor; and
   memory storing computer-executable instructions that, when executed by the processor, cause the device to:
   select a first Internet Protocol Multimedia Subsystem (IMS) node among multiple available IMS nodes;
   transmit a first unprotected registration request to the first IMS node;
   receive a first registration response from the first IMS node that specifies a type of error in a particular error category;
   in response to receiving the first registration response that specifies the type of error, select a second IMS node among the multiple available IMS nodes;
   transmit a second unprotected registration request to the second IMS node;
   receive a second registration response from the second IMS node that specifies the type of error;
   determine that a criterion is met; and
   refrain, based at least in part on the criterion being met, from transmitting any additional unprotected registration requests until an occurrence of a trigger event.

2. The device of claim 1, wherein determining that the criterion is met comprises determining that there are no additional IMS nodes among the multiple available IMS nodes to which the device has not already sent an unprotected registration request.

3. The device of claim 1, wherein the computer-executable instructions, when executed, further cause the device, prior to selecting the first IMS node, to start a timer that is to run for a predetermined period of time,
   wherein determining that the criterion is met comprises determining that the predetermined period of time has lapsed.

4. The device of claim 1, wherein the computer-executable instructions, when executed, further cause the device to determine, at a time after transmitting the first unprotected registration request and before transmitting the second unprotected registration request, a time period,
   wherein transmitting the second unprotected registration request to the second IMS node is performed in response to a lapse of the time period.

5. The device of claim 4, wherein the time period is determined by:
   calculating a time range based at least in part on a number of unprotected registration requests that have been transmitted from the device at the time; and
   selecting the time period as a randomly selected time within the time range.

6. The device of claim 1, wherein:
   the device is attached to a carrier network via a 3rd Generation Partnership Project (3GPP) radio access network; and
   wherein the trigger event occurs when the device moves within range of a Wi-Fi radio access network and attaches to the carrier network via the Wi-Fi radio access network.

7. The device of claim 1, wherein the type of the error is a 403 forbidden error.

8. A method comprising:
   selecting, by a user equipment (UE), a first Internet Protocol Multimedia Subsystem (IMS) node among multiple IMS nodes available to the UE for selection;
   transmitting, by the UE, a first unprotected registration request to the first IMS node;

receiving, by the UE, a first registration response from the first IMS node that specifies a type of error in a particular error category;

in response to receiving the first registration response that specifies the type of error, selecting, by the UE, a second IMS node among the multiple IMS nodes;

transmitting, by the UE, a second unprotected registration requests to the second IMS node;

receiving, by the UE, a second registration response from the second IMS node that specifies the type of error;

determining, by the UE, that a criterion is met; and refraining, based at least in part on the criterion being met, from transmitting any additional unprotected registration requests until an occurrence of a trigger event.

9. The method of claim 8, wherein determining that the criterion is met comprises determining that there are no additional IMS nodes among the multiple IMS nodes to which the UE has not already sent an unprotected registration request.

10. The method of claim 8, further comprising, prior to selecting the first IMS node, starting a timer that is to run for a predetermined period of time, wherein determining that the criterion is met comprises determining that the predetermined period of time has lapsed.

11. The method of claim 8, further comprising determining, at a time after transmitting the first unprotected registration request and before transmitting the second unprotected registration request, a time period, wherein transmitting the second unprotected registration request to the second IMS node is performed in response to a lapse of the time period.

12. The method of claim 11, further comprising determining the time period by:

calculating a time range based at least in part on a number of unprotected registration requests that have been transmitted from the UE at the time; and selecting the time period as a randomly selected time within the time range.

13. The method of claim 8, wherein the trigger event occurs when the UE powers down and subsequently powers up.

14. The method of claim 8, wherein the type of the error is a 403 forbidden error.

15. The method of claim 8, further comprising starting a timer that is to run for a predetermined period of time, wherein:

determining that the criterion is met comprises determining whichever criterion is met first between a first criterion and a second criterion;

the first criterion is met when the predetermined period of time has lapsed; and the second criterion is met when there are no additional IMS nodes among the multiple IMS nodes to which the UE has not already sent an unprotected registration request.

16. One or more non-transitory computer-readable media storing computer-executable instructions that, when executed, by one or more processors of a user equipment (UE) cause the UE to perform acts comprising:

selecting a first Internet Protocol Multimedia Subsystem (IMS) node among multiple IMS nodes available to the UE for selection;

transmitting a first unprotected registration request to the first IMS node;

receiving a first registration response from the first IMS node that specifies a type of error in a particular error category;

in response to receiving the first registration response that specifies the type of error, selecting a second IMS node among the multiple IMS nodes;

transmitting a second unprotected registration requests to the second IMS node;

receiving a second registration response from the second IMS node that specifies the type of error;

determining that a criterion is met; and refraining, based at least in part on the criterion being met, from transmitting any additional unprotected registration requests until an occurrence of a trigger event.

17. The one or more non-transitory computer-readable media of claim 16, wherein determining that the criterion is met comprises determining that there are no additional IMS nodes among the multiple IMS nodes to which the UE has not already sent an unprotected registration request.

18. The one or more non-transitory computer-readable media of claim 16, wherein the acts further comprise, prior to selecting the first IMS node, starting a timer that is to run for a predetermined period of time, wherein determining that the criterion is met comprises determining that the predetermined period of time has lapsed.

19. The one or more non-transitory computer-readable media of claim 16, wherein:

the UE is attached to a carrier network via a 3rd Generation Partnership Project (3GPP) radio access network; and wherein the trigger event occurs when the UE moves within range of a Wi-Fi radio access network and attaches to the carrier network via the Wi-Fi radio access network.

20. The one or more non-transitory computer-readable media of claim 16, wherein:

the UE is attached to a roaming partner carrier network via a first radio access network; and wherein the trigger event occurs when the UE attaches to a home carrier network via a second radio access network.

* * * * *